Patented Aug. 23, 1938

2,127,497

UNITED STATES PATENT OFFICE 2,127,497

LUBRICATING GREASE

Frederick Arthur Webster, Jr., Richmond, Calif., assignor to Standard Oil Company of California, San Francisco, Calif., a corporation of Delaware No Drawing. Application May 21, 1934, Serial No. 726,730

9 Claims. (Cl. 87—9)

This invention relates to a lubricating grease and method of making the same. In particular it relates to a grease which can be used in service where it is subjected to violent working at a temperature well above the boiling point of water. Examples of this kind of service are the push rods and rocker arms of motorcycles and airplane engines in which such parts are housed in closed boxes. In normal operation these parts move at a high speed and the temperature of the lubricant with which they are packed rises to 300°–400° F.

In order to lubricate this kind of equipment properly there is required a grease which is sufficiently fluid under operating conditions so as to give good lubrication and yet one which retains sufficient body so that it will not run off and leave the bearings dry. Likewise, it must be a grease which will neither separate into its component parts nor become gummy and stringy due to the prolonged working at high temperature.

Greases of the soda soap type are unsatisfactory for this service because they quickly separate into oil (which leaks out of the box) and soap (which lubricates poorly and is difficult to remove). Greases of the aluminum soap type have also proven unsatisfactory because the heating causes them to stiffen and become stringy or gummy. As a consequence their lubricating property drops off rapidly and it is very difficult subsequently to clean the rocker arm boxes for the inspection of parts and the checking of push rod clearance.

I have discovered that all of the above named difficulties can be overcome by a grease which is compounded from a soda soap, an aluminum soap and an oil base. The relative proportions of the two types of soap are very important. I have found that, in order to make a satisfactory grease, it is necessary to use from 7 to 9% by weight of the soda soap and from 93 to 91% of the aluminum soap. The oil used in the grease may be any desired specification, depending on the consistency, color, etc., desired in the finished grease. Likewise, the proportion of oil to soap may be varied in accordance with the desire of the compounder.

The function of soap in a grease is primarily to act as a thickener for the body of oil. The function of my soap mixed in critical proportions is to provide a thickener which will neither separate from the oil nor render it objectionably rubbery or gummy after prolonged use at elevated temperatures. In making a grease in accordance with my invention I have found that satisfactory results are not obtained when the attempt is made to saponify the soda and aluminum together. I therefore prefer to manufacture each soap stock separately, and even to compound the same with lubricating oil separately, and then to blend the two greases by suitable mixing devices such as are well known in the industry.

An example of a grease made in accordance with my invention is as follows: A soda grease was made by saponifying caustic soda with tallow and mixed animal fatty acids and the soap thoroughly blended with a refined petroleum oil, free from moisture and foreign matter, having a viscosity of 200–230 at 210° F. 92% by weight of this oil was used and 8% by weight of the soda soap. An aluminum grease was made by blending aluminum stearate with the same type of oil as was used in making the soda grease, 92% by weight of oil and 8% by weight of aluminum stearate being used. The two greases were then thoroughly blended in the proportions of 7.5% of the soda grease to 92.5% of the aluminum grease.

Although soda soap has been referred to above as a satisfactory component of my grease, satisfactory results may be obtained by the substitution therefor of potassium or calcium soaps, or a mixture thereof. When I speak of soda soap or "soda-type" soap, I mean to include soap made from any one or more of the group sodium, potassium, calcium. Likewise aluminum palmitate may be substituted in whole or in part for the stearate described.

I have described a grease made from the mixed soaps and petroleum oil, but the principle of my invention, namely, the use of a properly balanced soap thickener, may be applied with equally beneficial results to greases which contain other lubricating bases or matter added for special purposes, e. g., castor oil, graphite, and so on.

Having thus described my invention, I claim:

1. A lubricating grease containing a soda-type soap and aluminum stearate in the ratio of 7 to 9 percent by weight to 93 to 91 percent by weight, respectively, and lubricating oil.

2. A lubricating grease containing a soda-type soap and aluminum palmitate, in the ratio of 7 to 9 percent by weight to 93 to 91 percent by weight, respectively, and lubricating oil.

3. A lubricating grease containing lubricating oil a soda-type soap, and a mixture of aluminum stearate and aluminum palmitate, in the ratio of soda soap to aluminum soap within the range 7 percent to 93 percent and 9 percent to 91 percent.

4. A grease which comprises a homogeneous blend of lubricating oil with (a) a fatty acid soap selected from the group consisting of fatty acid soaps of sodium, potassium and calcium, and (b) aluminum stearate, the weight proportions of these soaps being 7 to 9 percent of (a) and 93 to 91 percent of (b).

5. A grease which comprises a homogeneous blend of lubricating oil with (a) a fatty acid soap selected from the group consisting of fatty acid soaps of sodium, potassium and calcium, and (b) aluminum palmitate, the weight proportions of these soaps being 7 to 9 percent of (a) and 93 to 91 percent of (b).

6. A homogeneous mixed grease comprising 7.5 percent by weight of sodium soap, 92.5 percent by weight of aluminum stearate, and viscous hydrocarbon oil.

7. The method of making a lubricating grease comprising mixing a fatty acid soap of one of the group sodium, potassium and calcium soap, with a lubricating oil, separately mixing one of the group aluminum stearate and aluminum palmitate with a lubricating oil, then mechanically mixing the two greases in such proportions that the mixture shall contain 7 to 9 percent by weight of the soda-type soap and 93 to 91 percent by weight of the aluminum soap.

8. A grease which comprises a homogeneous blend of lubricating oil with (a) a mixed fatty acid soap the components of which are selected from the group consisting of fatty acid soaps of sodium, potassium and calcium; and (b) aluminum stearate, the weight proportions of these soaps being 7 to 9 percent of (a) and 93 to 91 percent of (b), and the weight proportions of total soap to total lubricating oil being sufficient to give the mixture the consistency of grease at normal temperatures.

9. A grease which comprises a homogeneous blend of lubricating oil with (a) a mixed fatty acid soap the components of which are selected from the group consisting of fatty acid soaps of sodium, potassium and calcium; and (b) aluminum palmitate, the weight proportions of these soaps being 7 to 9 percent of (a) and 93 to 91 percent of (b), and the weight proportions of total soap to total lubricating oil being sufficient to give the mixture the consistency of grease at normal temperatures.

F. ARTHUR WEBSTER, JR.